(No Model.)
M. BURGESS.
VEHICLE WHEEL.
No. 500,703.　　　　　　　　Patented July 4, 1893.
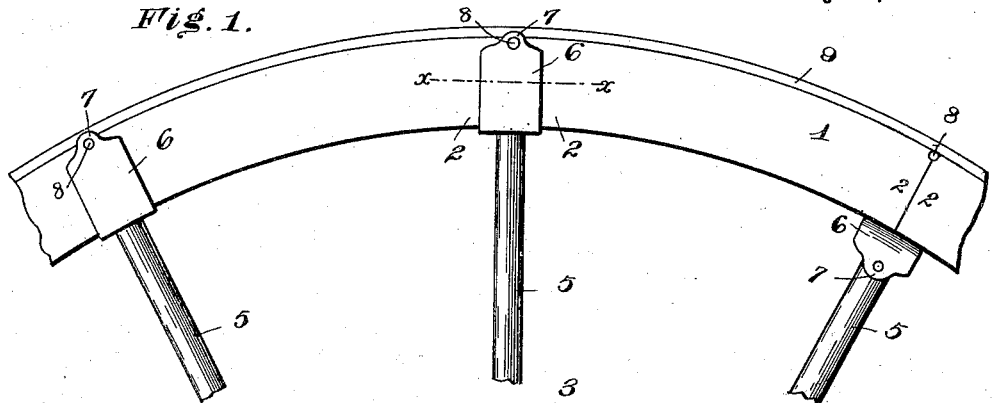
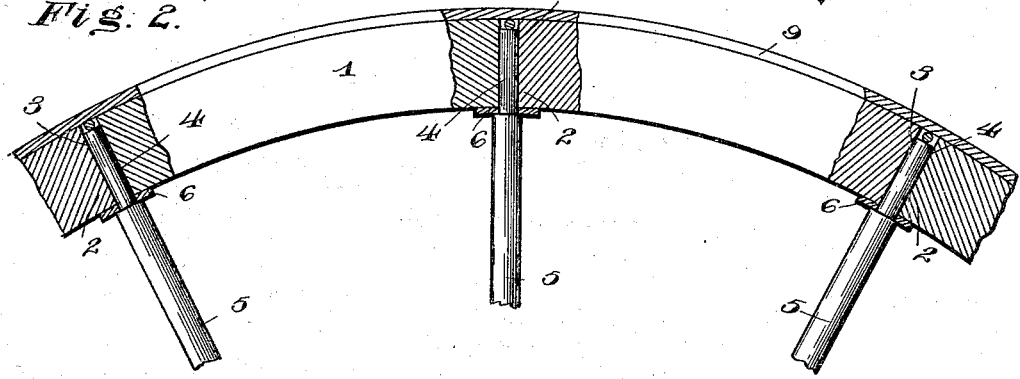
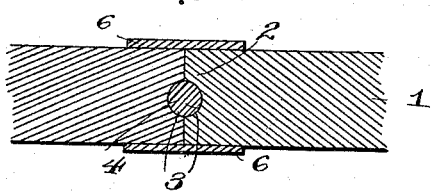
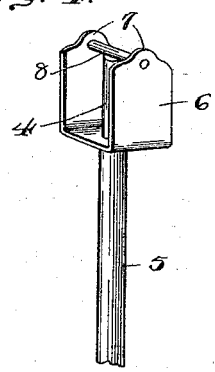 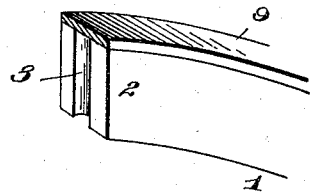
Witnesses
C. A. Ford.
N. T. Riley.
Inventor
Melancthon Burgess.
By his Attorneys,
C. A. Snow & Co.

UNITED STATES PATENT OFFICE.

MELANCTHON BURGESS, OF ST. GEORGE, UTAH TERRITORY, ASSIGNOR OF ONE-HALF TO JOHN L. SMITH, OF SAME PLACE.

VEHICLE-WHEEL.

SPECIFICATION forming part of Letters Patent No. 500,703, dated July 4, 1893.

Application filed March 14, 1893. Serial No. 465,899. (No model.)

*To all whom it may concern:*

Be it known that I, MELANCTHON BURGESS, a citizen of the United States, residing at St. George, in the county of Washington and Territory of Utah, have invented a new and useful Vehicle-Wheel, of which the following is a specification.

The invention relates to improvements in wheels.

The object of the present invention is to improve the construction of felly connections for wheels, and to provide a connection adapted to be employed in wheels having either sawed or bent fellies.

The invention consists in the construction and novel combination and arrangement of parts hereinafter fully described, illustrated in the accompanying drawings and pointed out in the claims hereto appended.

In the drawings—Figure 1 is a side elevation of a portion of a wheel having a felly connection embodying the invention. Fig. 2 is a longitudinal sectional view. Fig. 3 is a detail sectional view on line x—x of Fig. 1. Fig. 4 is a detail perspective view of an end of a spoke provided with the felly clip. Fig. 5 is a detail perspective view of an end of a felly.

Like numerals of reference indicate corresponding parts in all the figures of the drawings.

1 designates a felly having its adjacent ends 2 oppositely grooved at 3 and fitted against each other and around a tenon 4 of a spoke 5. The felly may be a bent one, or it may be constructed of sawed sections, but in either case the joint will always occur at a spoke, and the adjacent ends of the sections will be constructed as shown, and if the felly be a bent one the construction is the same. The ends of the felly are supported and securely held against lateral or inward movement by a clip 6, consisting of a plate having a central opening to receive the tenon and opposite integral sides arranged on the side faces of the felly and terminating at their ends in ears 7, which are connected by a transverse bolt or rivet 8. The plate portion of the clip fits against the shoulder of the spoke and supports the ends of the felly; and the bolt or rivet passes through the felly beyond the tenon and directly beneath the tire 9. By this construction the ends of the felly are supported against inward and lateral movement and are securely held in proper position, and enable the parts of a wheel to be readily assembled.

In assembling the parts of a wheel the sides of the clip may be readily bent back to enable free access to be had to the joint, as the sides are integral with the plate portion.

Spoke sockets between the joints of a wheel, provided with the improved felly connections, may be made in the ordinary manner by providing a tenon on the spoke and an ordinary hole or socket in the felly to receive the tenon.

Changes in the form, proportion and the minor details of construction may be resorted to without departing from the principle or sacrificing any of the advantages of this invention.

What I claim is—

In a wheel, the combination of a felly having its adjacent ends fitted together and provided with similar grooves forming a tenon socket, a spoke having a tenon fitting in the grooves of the felly, a felly clip composed of a plate portion having a central opening receiving said tenon and fitting against the shoulder of the spoke and supporting the ends of the felly and the integral side portion arranged on the sides of the felly and terminating in ears, and the transverse bolt or rivet passing through the ears and the felly and located beyond the ends of the tenon, substantially as described.

In testimony that I claim the foregoing as my own I have hereto affixed my signature in the presence of two witnesses.

MELANCTHON BURGESS.

Witnesses:
ERASTUS B. SNOW,
FRANK SNOW.